(12) United States Patent
Beloff

(10) Patent No.: US 6,206,356 B1
(45) Date of Patent: Mar. 27, 2001

(54) TRAY FOR HOLDING FOOD

(76) Inventor: Arthur L. Beloff, 61 Curlew Rd., Manalapan, FL (US) 33462

( * ) Notice: Subject to any disclaimer, the term of this patent is extended or adjusted under 35 U.S.C. 154(b) by 0 days.

(21) Appl. No.: 09/318,189

(22) Filed: May 25, 1999

(51) Int. Cl.[7] .................................................. B23Q 3/00
(52) U.S. Cl. .......................... 269/289 R; 269/302.1; 269/305; 269/303
(58) Field of Search .................. 269/289 R, 302.1, 269/305, 306, 900, 902, 303

(56) References Cited

U.S. PATENT DOCUMENTS

| | | | |
|---|---|---|---|
| 1,099,996 | * | 6/1914 | Parsons .............................. 269/289 R |
| 5,366,208 | * | 11/1994 | Benjamin .......................... 269/302.1 |
| 5,499,666 | * | 3/1996 | Foster et al. ....................... 269/302.1 |
| 5,527,022 | * | 6/1996 | Gibson .............................. 269/289 R |
| 5,549,238 | * | 8/1996 | Hindle ............................... 269/289 R |
| 5,580,037 | * | 12/1996 | Gore .................................. 269/302.1 |
| 5,598,759 | * | 2/1997 | Sie et al. ........................... 269/289 R |

* cited by examiner

*Primary Examiner*—Joseph J. Hail, III
*Assistant Examiner*—Lee Wilson
(74) *Attorney, Agent, or Firm*—A. Jose Cortina; Laura M. Kelley; Kilpatrick Stockton LLP

(57) ABSTRACT

A device for supporting an item of food, comprising a base member having a center longitudinal axis and a center lateral axis, and a plurality of first support members disposed on each side of the center longitudinal axis of the base member. The first support members are attached to the base member and substantially perpendicular thereto. The first support members having a food supporting edge sloping downward toward the longitudinal axis of the base member.

12 Claims, 4 Drawing Sheets

US 6,206,356 B1

TRAY FOR HOLDING FOOD

FIELD OF THE INVENTION

This invention relates generally to devices used to hold items of food. More particularly, the invention relates to a device which is capable of holding an item of food during food preparation operations such as carving, decorating and service.

BACKGROUND OF THE INVENTION

Some items of food can be cumbersome to prepare and serve due to the size and/or texture of the food. For example, turkeys, chickens, hams, roasts, and melons are often difficult to carve because the food item tends to move as the knife passes back and forth through the item. Additionally, juices from these and similar items also tend to make them slippery which also makes the item more difficult to hold and cut.

A variety of cutting boards and surfaces have been known for many years. Most of these are simply a flat surface, for example a wood board or block or a sheet of plastic, onto which a food item is placed so that a person cutting the food item will not cut through the food item and into the counter below. The board provides little, if any, benefit in stabilizing the food item while it is being carved.

Some advances have been made over the flat surface. Some cutting boards and block are now made with a recess which in the center which may tend to keep food items of certain shapes from sliding in certain cases. It is often the case, however, food items will slip on even these cutting boards either because the recess is not of adequate size to hold the food item in place or because fluid draining from the food item or which are poured on the food item tend to make the board and food item slippery.

Another advance over the simple flat board is a board onto which is attached one or more spikes rising from the board for holding the food item in place. Spikes, however, present a danger to personnel who use and clean the board. In addition, a spike large enough to hold one item of food may be too small to adequately hold a different item. Similarly, a spike sufficient to hold a large food item may tear apart a smaller item. Also, spikes in general tend to tear food items and may the food unattractive for presentation.

Another variation involves a board having a rod extending vertically therefrom. Another rod is slidably received on the vertically extending rod and extends perpendicularly therefrom, i.e., in a horizontal direction. The horizontally extending rod includes downwardly extending spikes and includes a clamp for being held in fixed position on the vertically extending rod with the spikes embedded in the food to be held. As may be appreciated, this type of device includes all of the disadvantages of the aforementioned board having spikes, and is more cumbersome and difficult to use due to the sliding rod and clamp mechanism.

Due to the inadequacies of the present devices for holding food items, there is a need for a device which supports food items while the items are being prepared for service. There is also a need for a support device which can be used both for food preparation and also for actual service of the food. Accordingly, in accordance with the invention there is provided a device which overcomes the deficiencies of the prior art.

SUMMARY OF THE INVENTION

In one aspect, the present invention provides a device for supporting an item of food. The device includes a base member having a center longitudinal axis and a center lateral axis. A plurality of first support members are disposed on each side of the longitudinal axis of the base member. These first support members are attached to the base member and are substantially perpendicular to the base member. The first support members have a food supporting edge sloping downward toward the longitudinal axis of the base member.

In a second aspect of the present invention, the food supporting edge of the first support members is serrated.

In a third aspect of the present invention, the device also includes a second support member which is substantially centered about the intersection of the longitudinal and the lateral axes of the base member. The second support member may be made of a plurality of units.

In fourth aspect of the present invention, the base member further includes an outer edge surrounding the periphery of the base member which is raised above the base member.

In a fifth aspect of the present invention, the device includes a holder for the base member which has raised edges surrounding the base member.

Additional objects, aspects and advantages of the invention will become apparent to those skilled in the art upon reference to the preferred embodiments and the included drawings.

PREFERRED EMBODIMENTS OF THE INVENTION

In general, a device according to the present invention is used in food preparation operations such as carving, decorating and serving food. The present invention securely holds items of food while the food is being prepared and served without requiring a food preparer to hold the item stationary. For example, the present invention serves to hold a large roast or melon securely in position while the item is being carved by a chef, thus enabling the chef to carve the item without using one hand to hold the item stationary.

Figure 1:
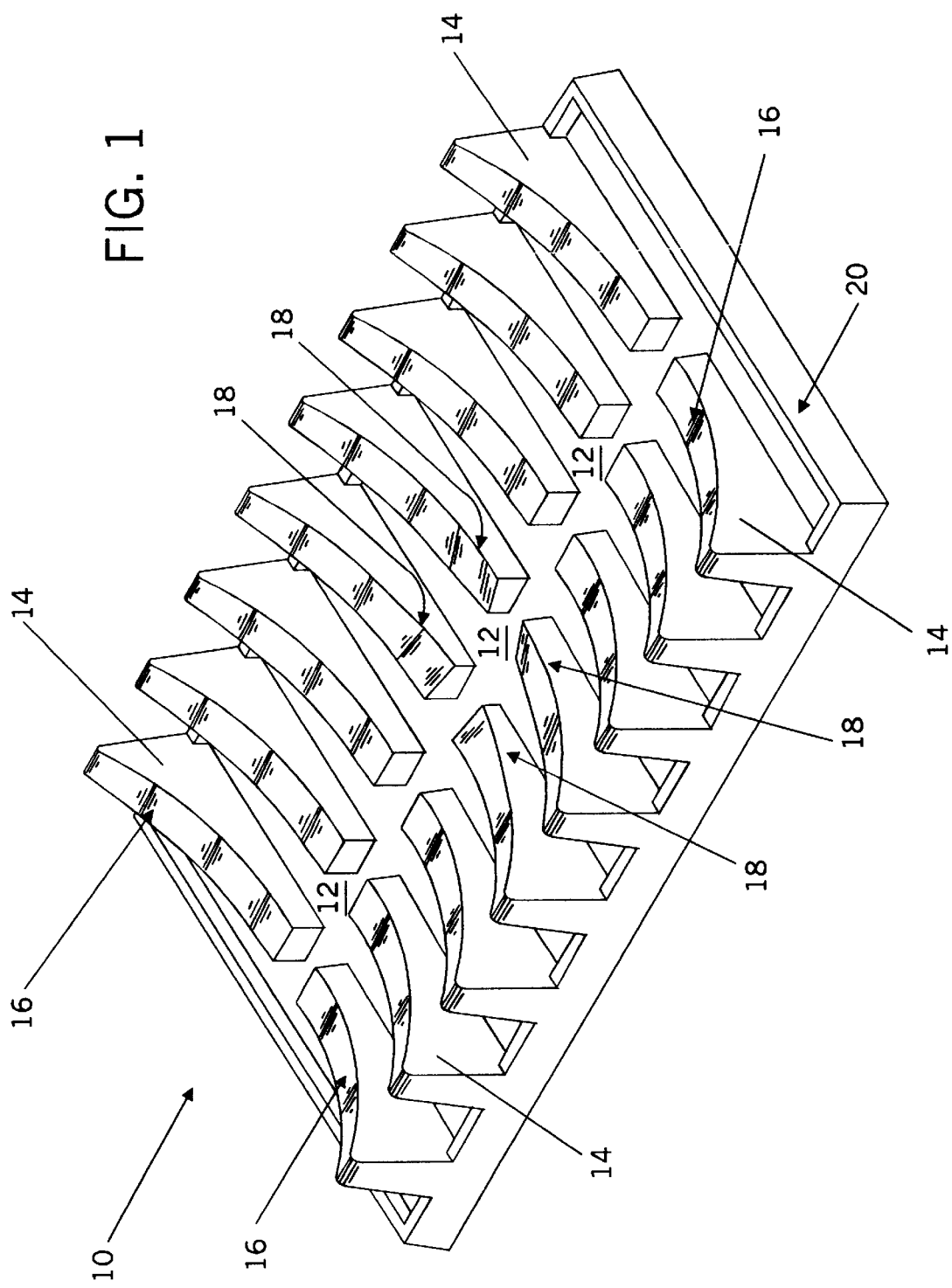
FIG. 1 is a perspective view of an embodiment of the present invention.

Referring now to FIG. 1, the device (10) according to the present invention comprises a base member (12) having a center longitudinal axis (not shown) and a center lateral axis (not shown). A plurality of first support members (14) are disposed on each side of the center longitudinal axis of the base member (12). The first support members (14) are attached to the base member (12) and rise substantially perpendicular from the base member (12). The first support members (14) have a food supporting edge (16) which slopes downward toward the longitudinal axis of the base member (12).

The base member (12) may have a substantially planar top surface to which the first support members are attached. Alternatively, the top surface of the base member (12) may be non-planar in order to enhance and reinforce the holding capacity of the device (10) or for other purposes. For example, in one embodiment, the top surface of the base member (12) may have a recessed portion in an otherwise planar top surface, the recessed portion being near the center of the base member (12) in order to receive a portion of the food item and thereby further stabilize the item. In addition, the recessed portion may provide a collection area for liquids which drain run from the food item.

The base member (12) may be formed from any suitable material capable of supporting the food items intended to be used on the device. Examples of suitable materials for the base member (12) include, but are not limited to wood, metal, and plastics. The first support members (14) may likewise be formed of any suitable material capable of supporting the food items intended to be used on the device (10).

The base member (12) is divided by a center longitudinal axis and a center lateral axis. Although in the embodiments shown in FIGS. 1–4, the center longitudinal axis is longer than the lateral axis, the present invention contemplates the device (10) in any suitable shape including those wherein the longitudinal axis is of the same length or shorter than the lateral axis.

The first support members (14) are disposed along both sides of the center longitudinal axis. In one embodiment, the first support members (14) form rows disposed substantially parallel to the center lateral axis. It should be understood, however, that the present invention does not require the first support members (14) to be disposed in rows parallel to the center lateral axis. The first support members (14) may be disposed directly opposite each other along the center longitudinal axis. In an alternative embodiment, the first support members (14) may be disposed in an alternating fashion along the center longitudinal axis such that a first support member (14) along one side of the center longitudinal axis is not directly opposite a first support member (14) along the opposite side of the center longitudinal axis.

It should also be understood that the first support members (14) may be positioned such that they are not completely parallel to the center lateral axis. It is contemplated that the first support members (14) of one embodiment of the device (10) could be positioned in a fashion similar to the spokes of a fan centered about the intersection of the center longitudinal and center lateral axes. Such an embodiment would better accommodate food items which are larger in the center of the item that at the ends.

Each of the first support members (14) include a food supporting edge (16). The food supporting edge (16) contacts the food item and holds it in position for preparation or service. In the embodiment shown in FIG. 1, the food supporting edge (16) is curvilinear in shape.

In order to more securely hold a food item in position, in one embodiment of the present invention an abrasive surface is formed on, or attached to, the food supporting edge (16). The abrasive surface could be formed from the material of the first support member (14) itself, or alternatively, an abrasive of a different type of material may be attached to the food supporting edge (16) by any suitable attaching means. For example, strips of an abrasive surface may be attached by a food safe adhesive or a mechanical device such as screws or pins. An alternative to abrasive surfaces, it is also expected that a non-skid surface could be placed on the food supporting edge (16). Such a non-skid surface might be made of rubber or plastic.

FIG. 1 also displays that the lower end portions of the food supporting edges (16) of the four first support members (14) directly adjacent to the lateral axis of the base member (12) may be tapered (18) downward toward the intersection of the center longitudinal and center lateral axes. The tapering (18) of the lower part of the food supporting edges (16) of these four first support members forms a well at the center of the device (10) for more securely holding an item of food. Although not shown, it is also contemplated that a well of a different shape, for example an oval shape, could be formed by cooperatively tapering the lower ends of the food supporting edges (16) of the first support members (14) in addition to just those four which are nearest the center lateral axis. Such tapering might be done to receive very large food items, or food items with large protrusions, or other specially shaped food items.

Although FIG. 1 illustrates that the lower end portions of the food supporting edges (16) of the four first support members (14) directly adjacent to the lateral axis of the base member (12) may be tapered (18) downward toward the intersection of the center longitudinal and center lateral axes, it is not required that any of the food supporting edges be tapered in order to practice the present invention. Rather, a device (10) according to the present invention may include may have only first support members (14) having food support edges (16) with a continuous slope.

Figure 2:
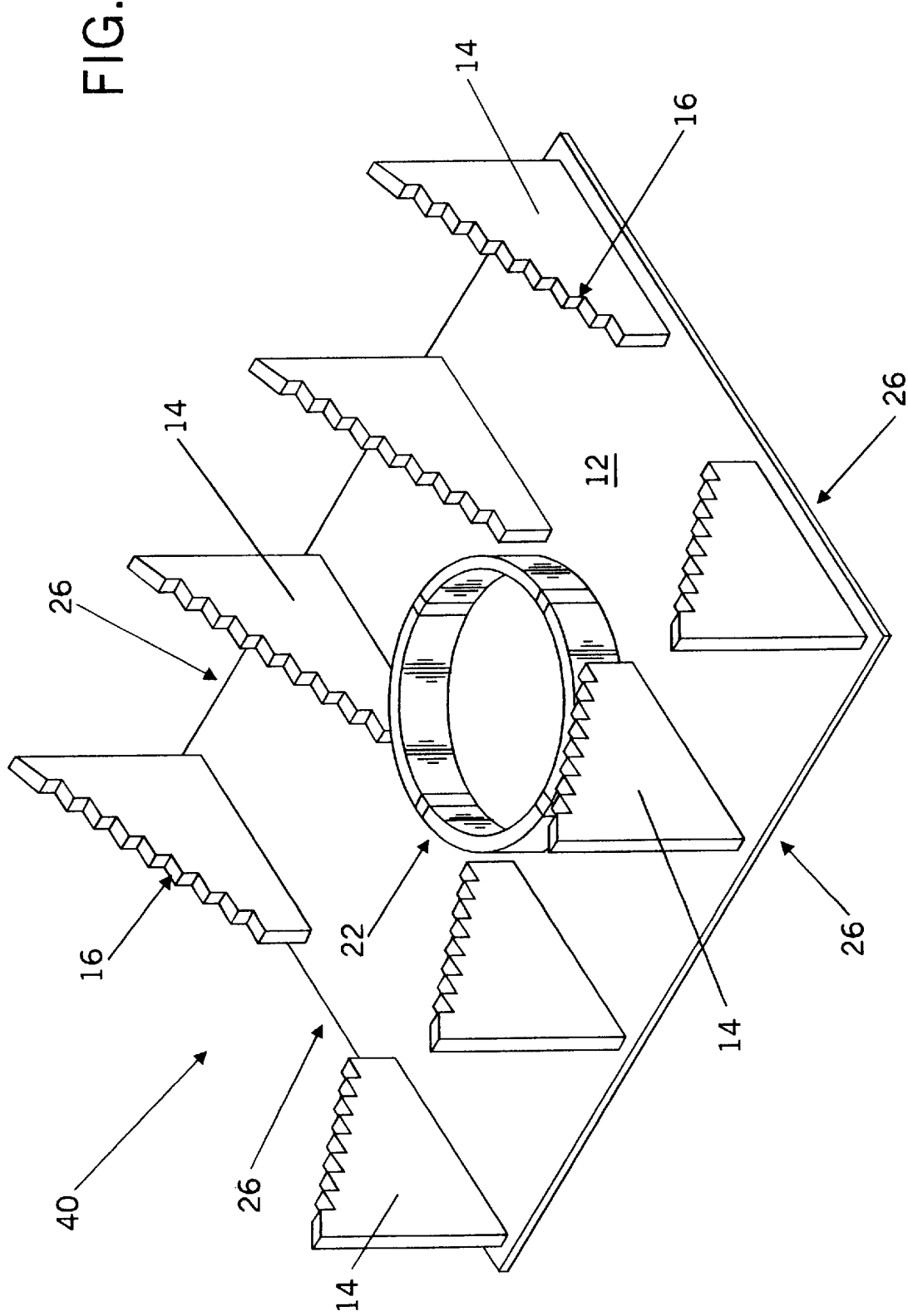
FIG. 2 is a perspective view of an embodiment of the present invention.

Turning now to FIG. 2, a device (40) is disclosed in which the food supporting edges (16) of the first support members (14) are serrated. The serrations may take the form of a sawtooth, step, wave or any other pattern in which parts of the surface of the food supporting edge (16) protrude from the surface and are able to hold a food item in place on the food support members.

FIG. 2 also illustrates a second support member (22) substantially centered about the intersection of the center longitudinal and the center lateral axes of the base member (12). It is expected that certain items of food may be of such size or shape that it would be desirable to have additional support for the middle of the food item. The second support member (22) serves to receive and support the middle of a food item. The second support member (22) illustrated in FIG. 2 is in the shape of a ring, but preferably contains discontinuities so as to allow a knife to pass beneath the surface of the ring. It is contemplated however, that the second support member could be of any size or shape necessary to accommodate a particularly shaped of size of food item. Some examples of shapes include ovals, rectangles, and crosses. It is also contemplated that the second support member may not be centered at the intersection of the longitudinal and lateral axes for certain items of food which might require additional support at a point on the center longitudinal axis either above or below the center lateral axis.

Figure 3:
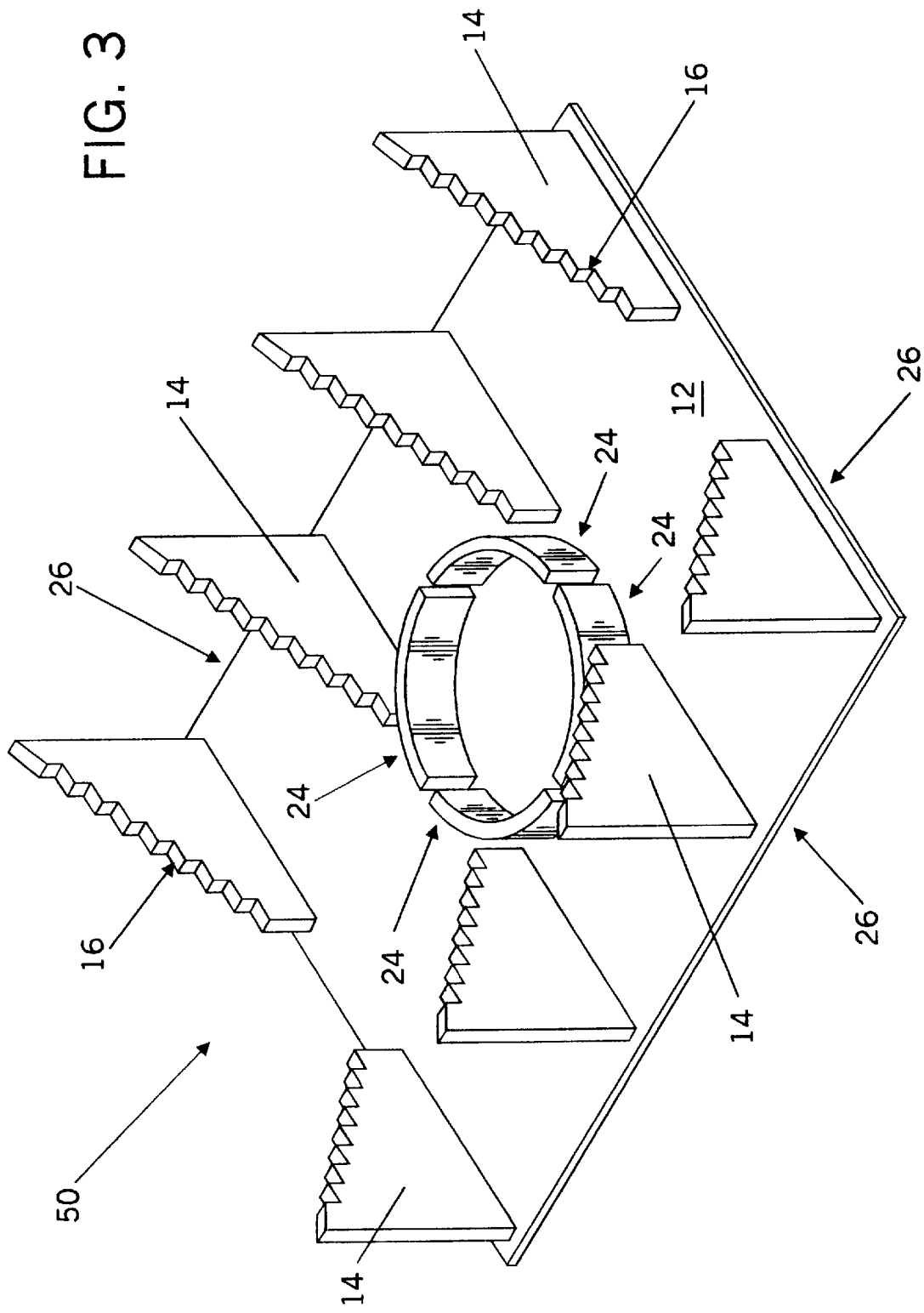
FIG. 3 is a perspective view of an embodiment of the present invention.
Figure 4:
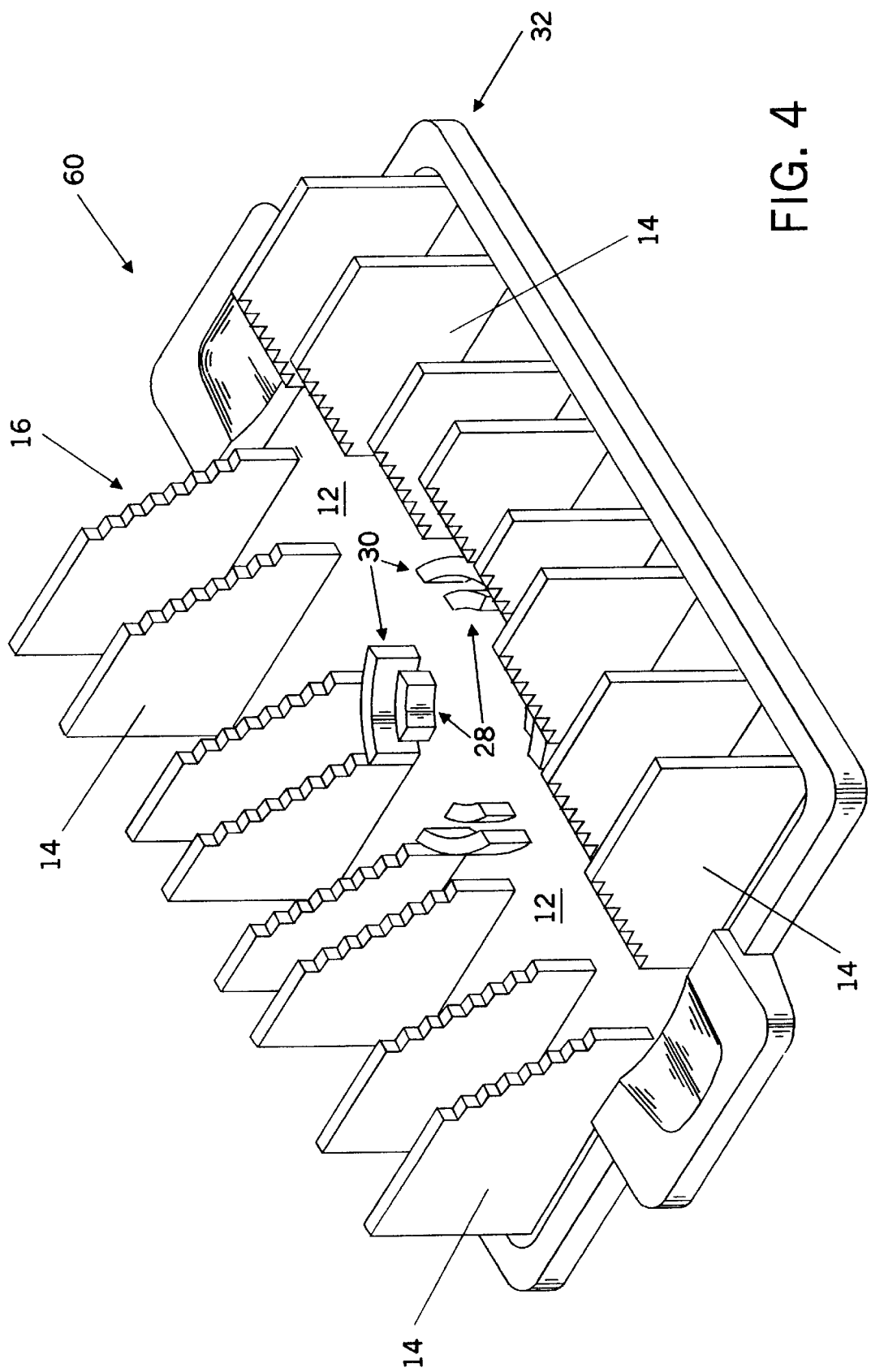
FIG. 4 is a perspective view of an embodiment of the present invention.

As shown in FIGS. 3 and 4, the second support member (22) may be formed from a plurality of units (24) which cooperate to form the shape of the second support member (22).

As shown in FIG. 4, it is also contemplated that the plurality of units (24) may include inner units (28) which are closer to the intersection of said longitudinal and said lateral axes and outer units (30) which are farther away from the intersection of the axes. As illustrated in FIG. 4, in some cases it will be desirable to have inner units (28) which are shorter than the outer units (30).

Also as shown in FIG. 4, it is expected that the first support members (14) may be made such that the size of the first support members vary to better receive different shaped objects. For example, it is expected that first support members (14) closer to the intersection of the center longitudinal and center lateral axis will not protrude as far toward the center longitudinal axis as those first support members which are farther away from the intersection. This arrangement allows the device to better accommodate objects which are larger in the middle than at the ends of the object. The device (60) illustrated in FIG. 4, is considered to be the preferred embodiment of the invention.

Referring back to FIGS. 1 and 2, the outer edge (26) of the base member (12) may also be surrounded by a raised outer edge (20) surrounding the periphery of the base member (12). The raised outer edge (20) serves to capture liquids which drain from the food item being prepared. In another embodiment of the instant invention shown in FIG. 4, the device (60) includes a holder (32) which surrounds the base member (12) and may likewise serve to capture liquids which drain from the food item being prepared. In addition, it is contemplated that the base member (12) may be removable from the holder (32). In the embodiment where the base member (12) is removable, it is expected that the holder (32) would allow transport of the base member and its attachments even after the base member and attachment had been exposed to heat or cold. Of course, it is also contemplated that the holder (32) may be fixedly attached to, or be an integral part of, the base member (12).

Although the invention has been shown and described with respect to various embodiments thereof, it should be understood by those skilled in the art that various changes, omissions, and additions may be made to the form and detail of the disclosed embodiment without departing from the spirit and scope of the invention, as recited in the following claims.

What is claimed:

1. A device for supporting an item of food, comprising:
   a base member having a center longitudinal axis and a center lateral axis;
   a plurality of first support members extending substantially adjacent each side of said center longitudinal axis of said base member, with said first support members being attached to said base member;
   each one of said plurality of first support members having a top edge which is vertically higher at an end of each one of said plurality of first support members furthest away from said center longitudinal axis than an end of each one of said plurality of first support members closest to said center longitudinal axis;
   a support surface on each one of said plurality of first support members extending from the end of each one of said plurality of first support members furthest from said center longitudinal axis to the end of each one of said plurality of first support members closest to said center longitudinal axis; and
   each surface of each one of said plurality of first support members being serrated.

2. A device according to claim 1, wherein said food supporting edge is curvilinear.

3. A device according to claim 1, wherein said base member further comprises an outer edge surrounding the periphery of said base member, said outer edge being raised above said base member.

4. A device according to claim 1, further comprising a holder for said base member, said holder having raised edges surrounding said base member.

5. A device for supporting an item of food, comprising:
   a base member having a center longitudinal axis and a center lateral axis; a plurality of first support members extending substantially adjacent each side of said center longitudinal axis of said base member, with said first support members being attached to said base member;
   each one of said plurality of first support members having a top edge which is vertically higher at an end of each one of said plurality of first support members furthest away from said center longitudinal axis than an end of each one of said plurality of first support members closest to said center longitudinal axis;
   a support surface on each one of said plurality of first support members extending from the end of each one of said plurality of first support members furthest from said center longitudinal axis to the end of each one of said plurality of first support members closest to said center longitudinal axis;
   each surface of each one of said plurality of first support members being serrated; and
   a second support member of substantially circinate shape made up of at least one piece connected to and extending vertically from the base, and substantially centered about the intersection of said center longitudinal and said center lateral axes of said base member, and having an upper surface for providing support to an item of food.

6. A device according to claim 5, wherein said second support member comprises a plurality of units.

7. A device according to claim 6, said plurality of units comprising first inner units and second outer units, said first inner units being disposed closer to the intersection of said center longitudinal and said center lateral axes than said second outer units.

8. A device according to claim 7, wherein said first inner units are shorter than said second outer units.

9. A device according to claim 5, wherein said food supporting edge is curvilinear.

10. A device according to claim 5, wherein said base member further comprises an outer edge surrounding the periphery of said base member, said outer edge being raised above said base member.

11. A device according to claim 5, further comprising a holder for said base member, said holder having raised edges surrounding said base member.

12. A device according to claim 5, further comprising a holder for said base member, said holder having raised edges surrounding said base member.

* * * * *

UNITED STATES PATENT AND TRADEMARK OFFICE
CERTIFICATE OF CORRECTION

PATENT NO. : 6,206,356 B1  
DATED : March 27, 2001  
INVENTOR(S) : Arthur L. Beloff Page 1 of 1

It is certified that error appears in the above-identified patent and that said Letters Patent is hereby corrected as shown below:

Claim 6,
Line 2, between "of" and "units" insert -- curved --.

Claim 7,
Line 1, between the word "claim" and the word "said" delete the number "6" and insert the number -- 5 --

Signed and Sealed this

Twenty-eighth Day of August, 2001

*Attest:*

NICHOLAS P. GODICI
*Attesting Officer*     *Acting Director of the United States Patent and Trademark Office*